(12) United States Patent
Massman et al.

(10) Patent No.: US 11,535,456 B2
(45) Date of Patent: Dec. 27, 2022

(54) VIBRATORY DRUM WITH CIRCULAR MOTION

(71) Applicant: General Kinematics Corporation, Crystal Lake, IL (US)

(72) Inventors: Steve Massman, Poplar Grove, IL (US); Kerry William Quinn, Palatine, IL (US)

(73) Assignee: General Kinematics Corporation, Crystal Lake, IL (US)

( * ) Notice: Subject to any disclaimer, the term of this patent is extended or adjusted under 35 U.S.C. 154(b) by 198 days.

(21) Appl. No.: 16/878,129

(22) Filed: May 19, 2020

(65) Prior Publication Data

US 2020/0369475 A1 Nov. 26, 2020

Related U.S. Application Data

(60) Provisional application No. 62/850,507, filed on May 20, 2019.

(51) Int. Cl.
*B65G 27/20* (2006.01)
*B65G 27/04* (2006.01)
*B65G 27/08* (2006.01)

(52) U.S. Cl.
CPC ............. *B65G 27/04* (2013.01); *B65G 27/08* (2013.01); *B65G 27/20* (2013.01); *B65G 2201/04* (2013.01); *B65G 2812/0308* (2013.01)

(58) Field of Classification Search
None
See application file for complete search history.

(56) References Cited

U.S. PATENT DOCUMENTS

| | | | |
|---|---|---|---|
| 2,760,727 | A | 8/1956 | Kiesskalt |
| 3,545,688 | A | 12/1970 | Oshima et al. |
| 3,677,395 | A | 7/1972 | Musschoot |
| 3,706,372 | A | 12/1972 | Musschoot |
| 3,750,866 | A | 8/1973 | Musschoot |
| 3,991,948 | A | 11/1976 | Schober et al. |
| 4,164,328 | A | 8/1979 | Kausel et al. |
| 4,511,092 | A | 4/1985 | North et al. |

(Continued)

FOREIGN PATENT DOCUMENTS

| | | |
|---|---|---|
| AU | 2018274892 | 2/2019 |
| EP | 2050503 | 4/2009 |
| GB | 984575 | 2/1965 |

OTHER PUBLICATIONS

International Search Report and Written Opinion, counterpart application No. PCT/US2020/033610 (dated Aug. 3, 2020) (12 pages).

*Primary Examiner* — Joseph A Dillon, Jr.
(74) *Attorney, Agent, or Firm* — Cook Alex Ltd.

(57) ABSTRACT

A vibratory drum includes a tubular drum having a longitudinal axis, and first and second vibratory generators disposed laterally relative to the longitudinal axis and opposite each other across the tubular drum. The drum also includes a frame to which the first and second vibratory generators are attached; and a plurality of resilient elements attached at a first end to the tubular drum and at a second end to the frame, whereby the vibratory motion of the generators is transferred to the tubular drum to impart a circular motion to material disposed in the tubular drum.

20 Claims, 6 Drawing Sheets

(56) References Cited

U.S. PATENT DOCUMENTS

| | | | |
|---|---|---|---|
| 4,530,431 A * | 7/1985 | Spurlin | B65G 27/32 198/534 |
| 4,545,509 A | 10/1985 | Musschoot et al. | |
| 4,709,507 A | 12/1987 | Musschoot | |
| 4,926,601 A | 5/1990 | Musschoot | |
| 5,265,730 A * | 11/1993 | Norris | B07B 1/42 209/326 |
| 5,512,008 A | 4/1996 | Musschoot | |
| 5,547,068 A * | 8/1996 | Spurlin | B65G 27/26 198/760 |
| 5,570,848 A | 11/1996 | Gock et al. | |
| 5,591,074 A | 1/1997 | Musschoot | |
| 6,029,796 A * | 2/2000 | Musschoot | B65G 27/20 198/770 |
| 6,237,749 B1 | 5/2001 | Musschoot et al. | |
| 6,702,102 B2 * | 3/2004 | Kraus | B65G 27/20 198/758 |
| 6,743,386 B2 | 6/2004 | Lease | |
| 7,383,942 B2 * | 6/2008 | Kato | B65G 27/30 198/767 |
| 7,681,818 B2 | 3/2010 | Peterson et al. | |
| 8,955,669 B2 * | 2/2015 | Mitzkat | B01J 8/16 198/756 |
| 8,998,043 B2 * | 4/2015 | Fruit | C03B 7/16 209/11 |
| 9,238,229 B1 * | 1/2016 | Kempf | B65G 27/32 |
| 9,849,486 B2 * | 12/2017 | Massman | B07B 1/46 |
| 10,124,963 B1 | 11/2018 | Steffes, Jr. | |
| 10,385,939 B2 * | 8/2019 | Quinn | F16F 1/126 |
| 10,532,890 B2 * | 1/2020 | Massman | B65G 27/04 |
| 2007/0170207 A1 | 7/2007 | Kraus et al. | |
| 2007/0240741 A1 * | 10/2007 | Lease | B22D 29/02 134/1 |
| 2008/0226400 A1 * | 9/2008 | Markowski | F26B 17/266 406/75 |
| 2021/0171287 A1 * | 6/2021 | Massman | B65G 27/26 |
| 2021/0347578 A1 * | 11/2021 | Mathis, Jr. | B65G 27/20 |

* cited by examiner

VIBRATORY DRUM WITH CIRCULAR MOTION

BACKGROUND

This patent is directed to a vibratory drum, and, in particular, to vibratory drum where circular motion is imparted to material disposed in the drum.

SUMMARY

A vibratory drum includes a tubular drum having a longitudinal axis, and first and second vibratory generators disposed laterally relative to the longitudinal axis and opposite each other across the tubular drum. The drum also includes a frame to which the first and second vibratory generators are attached; and a plurality of resilient elements attached at a first end to the tubular drum and at a second end to the frame, whereby the vibratory motion of the generators is transferred to the tubular drum to impart a circular motion to material disposed in the tubular drum.

BRIEF DESCRIPTION OF THE DRAWINGS

It is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF VARIOUS EMBODIMENTS

As illustrated in the attached drawings, a vibratory apparatus includes a tubular drum having a longitudinal axis, and first and second vibratory generators disposed laterally relative to the longitudinal axis and opposite each other across the tubular drum. The drum also includes a frame to which the first and second vibratory generators are attached; and a plurality of resilient elements attached at a first end to the tubular drum and at a second end to the frame, whereby the vibratory motion of the generators is transferred to the tubular drum to impart a circular motion to material disposed in the tubular drum.

Figure 1:
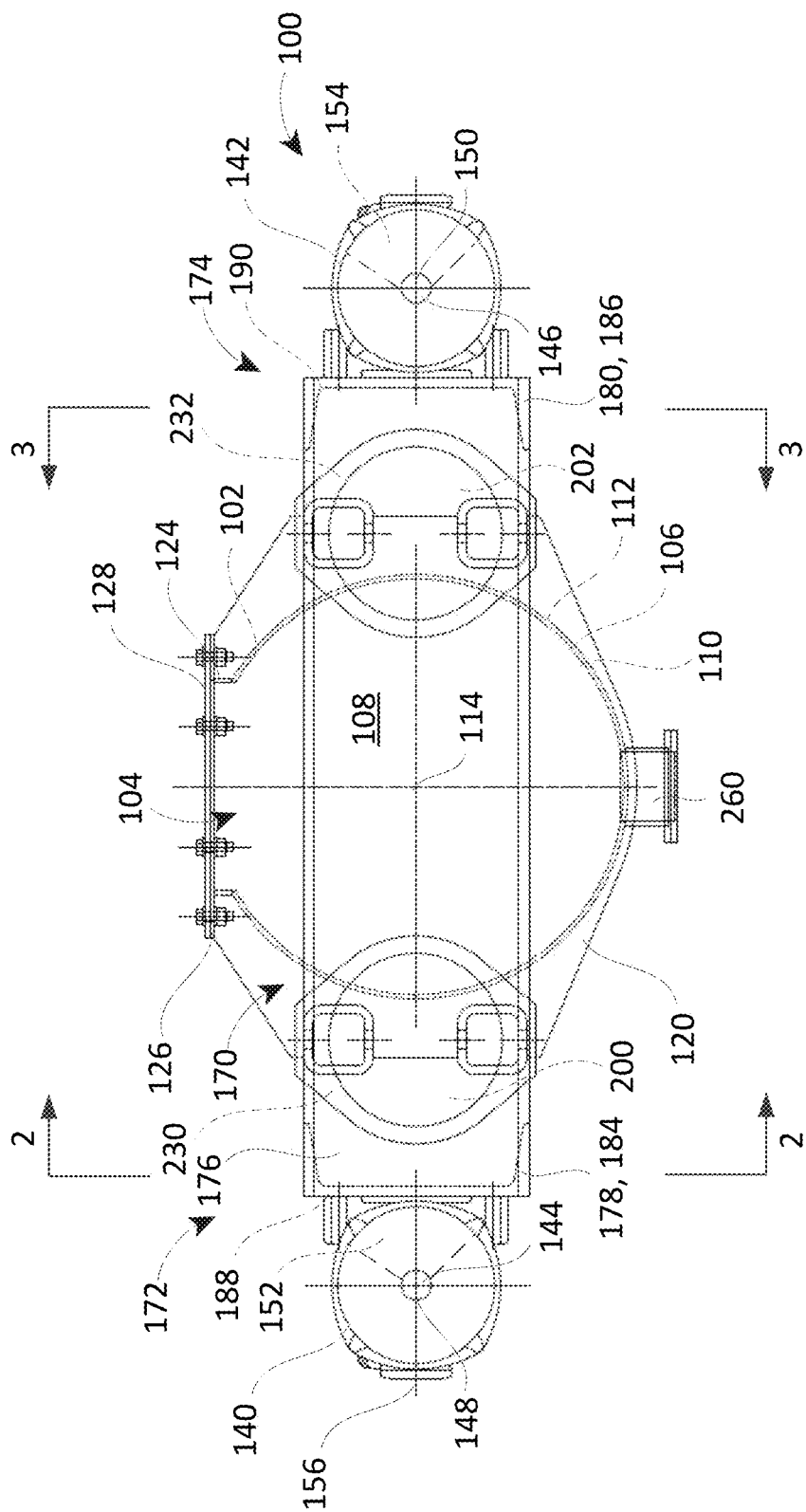
FIG. 1 is a frontal view of an embodiment of a vibratory drum.
Figure 2:
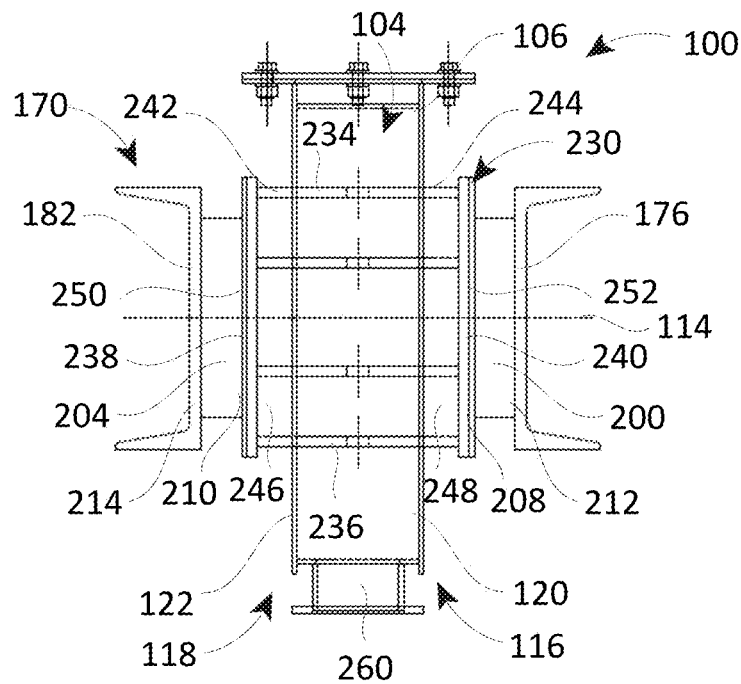
FIG. 2 is a cross-sectional view of the vibratory drum of FIG. 1 taken along line 2-2 in FIG. 1.
Figure 3:
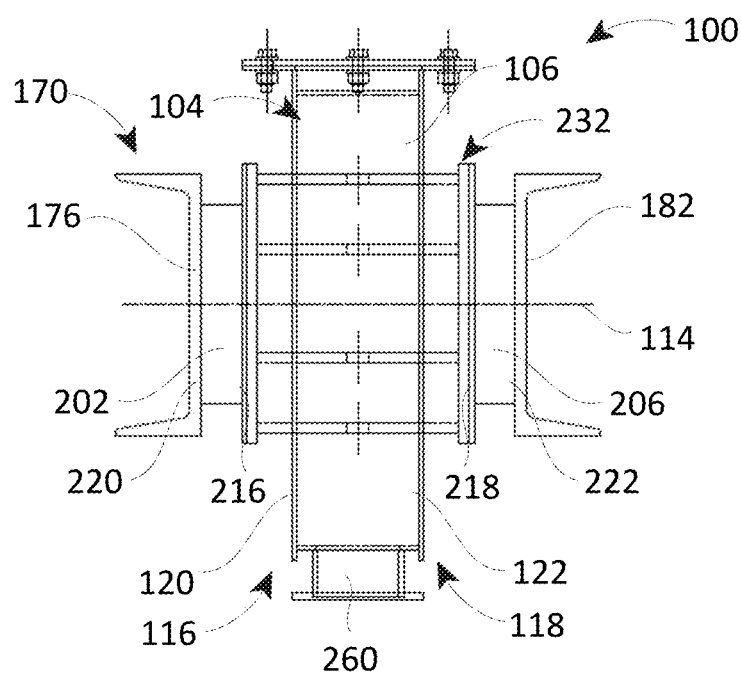
FIG. 3 is a cross-sectional view of the vibratory drum of FIG. 1 taken along line 3-3 in FIG. 1.

FIGS. 1-3 illustrate a first embodiment of the vibratory apparatus 100 including a drum 102 in which material is processed. The vibratory apparatus 100 may be referred to as a vibratory drum, and the two terms are used interchangeably herein. According to the embodiment of the vibratory drum 100 illustrated in FIGS. 1-3, material to be processed may be introduced into the drum 102 and removed from the drum 102 through a single opening 104. According to other embodiments, the material to be processes may be introduced into the drum through one opening, and removed from the drum through another opening, as will be explained below.

The drum 102 of the embodiment of FIGS. 1-3 has a generally cylindrical shape, with an annular wall 106 of circular cross-section that surrounds an interior volume 108, as best seen in FIG. 1. The wall 106 is referred to as circular even though the wall 106 is not continuous, because of the inclusion of the opening 104 to permit material to be introduced into and removed from the drum 102. As illustrated, the wall 106 (and thus the drum 102) has a curved inner surface 110 that also is substantially circular in cross-section, and a curved outer surface 112 that also is substantially circular in cross-section. The drum 102 has a central longitudinal axis 114 that lies substantially along the center of the circular cross-section of the drum 102.

According to other embodiments, the drum 102 may have a wall 106 that is not circular, but may be elliptical or hexagonal in cross-section, for example. As a further alternative, the wall 106 may have an inner surface that is curved (e.g., circular) in cross-section, but not an outer surface that is not curved in cross-section. In all such embodiments, the drum 102 may still have a central longitudinal axis that is at the center of the cross-section of the drum.

The wall 106 of the drum 102 is closed at opposite ends 116, 118 with plates 120, 122 that are disposed along the longitudinal axis 114, and that are orthogonal to the axis 114. See FIGS. 2 and 3. According to the illustrated embodiment, the length of the drum 102 between the ends 116, 118 is considerably smaller in dimension than the diameter of the drum 102 as defined by the wall 106. Compare, e.g., FIGS. 1 and 2. According to other embodiments, the dimension of the length between the ends 116, 118 may be comparable to the diameter of the drum 102.

As mentioned above, the drum 102 includes an opening 104 to receive material that is to be deposited into the drum 102, and so that material that has been processed may be removed from the drum 102. As illustrated in FIGS. 1-3, the opening 104 is connected to a chute 124 that defines a short passage that is in communication with the opening 104. The chute 124 has a flange 126 disposed about its perimeter, and a plate 128 is attached to the flange 126 to limit access to the opening 104. The plate 128 may be attached to the flange 126 by fasteners, such as the nut/bolt combinations illustrated, to permit the plate 128 to be selectively secured to the flange. Other fasteners, such as clamps, may be used instead.

The vibratory drum 100 also includes first and second vibratory generators 140, 142. The first and second vibratory generators 140, 142 are disposed laterally relative to the central longitudinal axis 114 and opposite each other across the tubular drum 102 (i.e., one of the generators 140 is disposed to the left of the drum 102 and the other of the generators 142 is disposed to right of the drum 102, with the directionality (right, left) for ease of explanation and by way of limitation). Each of the first and second vibratory generators 140, 142 includes a shaft 144, 146 having a shaft longitudinal axis 148, 150 parallel the central longitudinal axis 114. Each vibratory generator 140, 142 also has one or more eccentric weights 152, 154 attached to the shaft 144, 146 for rotation about the shaft longitudinal axis 148, 150.

As illustrated, the shaft axes 148, 150 are not only parallel to the central longitudinal axis 114, but the axes 148 and 150 are disposed along a single line 156 that traverses the central axis 114. As illustrated, the line 156 also passes through the center of mass of the assembly; if the center of mass was not aligned with the central axis 114, the line 356 may pass through the center of mass but not the central axis 114. Further, the axes 148, 150 are each disposed at the same distance from the central axis 114 along that line 156. It is believed that this arrangement may cause the most circular motion in the material in the drum 102, but does not mean that all embodiments of the drum 100 necessarily must have this orientation.

In accordance with the embodiment of FIGS. 1-3, each of the first and second generators 140, 142 includes a motor, the motor having a shaft that defines the shaft 144, 146. The one or more weights 152, 154 may include a pair of weights, with one of the pair of weights mounted on a first end of the shaft 144, 146 and the other of the pair of weights mounted on a second, opposite end of the shaft 144, 146. Further, the weights 152 appear to be at the same angular position on the shaft 144 as the weights 154 mounted on the shaft 146; it is believed that this state will occur naturally over time as the two motors synchronize with each other.

As will be explained below relative to the embodiment of FIGS. 5-9, generators 140, 142 may include motors that are separate from the shafts 144, 146 that mount the weights (or masses) 152, 154. That is, the shafts 144, 146 may be attached to the drum 102, but the motors may be mounted on the ground and be connected to the shafts 144, 146 via a joint (e.g., a universal joint) to cause the shafts 144, 146 to rotate. According to the illustrated embodiment, however, the generators 140, 142 include motors with shafts that define the shafts 144, 146.

To connect the generators 140, 142 to the drum 100, a frame 170 is provided. The generators 140, 142 are mounted on the frame 170 directly, for example with motor mounts securely attached (e.g., bolted) to opposite ends 172, 174 of the frame 170. The frame 170 is resilient mounted to the drum 102, whereby the vibratory motion of the generators 140, 142 is transferred to the drum 102 to impart a circular motion to material disposed in the drum 102. As such, the drum 100 represents a two-mass vibratory apparatus, with one mass including the drum 102 and another mass including the generators 140, 142 and frame 170, the masses being resilient coupled through the use of one or more resilient members, or springs. As will be explained, according to the illustrated embodiments, the resilient members may be toroidal in shape, and made of rubber or a polymer.

The frame 170 includes a first elongated, transverse member 176 disposed at the first end 116 of the drum 102 with first and second ends 178, 180 disposed laterally of the central longitudinal axis 114. The frame 170 also includes a second elongated, transverse member 182 disposed at the second end 118 of the drum 102 with first and second ends 184, 186 disposed laterally of the central longitudinal axis 114. The frame 170 may also include cross-members 188, 190 that are disposed and securely attached (e.g., welded) at the first ends 178, 184 and the second ends 180, 186 of the elongated, transverse members 176, 182, respectively. As such, the embodiment of the frame 170 appears like a rectangular box disposed about the drum 102 when viewed from the top or the bottom.

The first vibratory generator 140 is attached to the first ends 178, 184 of the first and second transverse members 176, 182, and the second vibratory generator 142 is attached to the second ends 180, 186 of the first and second transverse members 176, 182. As illustrated, the first vibratory generator 140 is securely attached to the cross member 188, and the second vibratory generator 142 is securely attached to the cross member 190. As mentioned above, according to certain embodiments, the generators 140, 142 may be releasably fastened to a motor mount that is securely attached (e.g., welded) to the cross members 188, 190.

As mentioned above, the frame 170 may be resiliently coupled to the drum 102. To this end, the apparatus 100 may include at least a first and a second resilient member 200, 202 (which also may be referred to as reaction springs). As best seen in FIGS. 2 and 3, a pair of resilient members 200, 204 and 202, 206 is disposed at the first and second ends 172, 174 of the frame 170.

Each of first set (e.g., pair) of resilient members 200, 204 is attached at a first end 208, 210 to the cylindrical drum 102 and at a second end 212, 214 to the first ends 178, 184 of the first and second transverse members 176, 182. In a similar fashion, each of the second set (e.g., pair) of resilient members 202, 206 attached at a first end 216, 218 to the drum 102 and at a second end 220, 222 to the second ends 180, 186 of the first and second transverse members 176, 182. The resilient members 200, 202, 204, 206 may be, for example, toroidal in shape relative to a longitudinal axis, which axis is parallel to the central longitudinal axis 114 (and thus appears collinear with the axis 114 in FIGS. 2 and 3).

According to the illustrated embodiment of FIGS. 1-3, the drum 102 has mounting platforms 230, 232 attached to the plates 120, 122 to provide a structure by which the resilient members 200, 202, 204, 206 are attached to the drum 102. As both of the platforms 230, 232 are of like construction, only the platform 230 illustrated in FIGS. 1 and 2 is discussed in detail. It will be recognized that the platforms 230, 232 do not represent the only structure for connecting the drum 102 to the resilient members 200, 202, 204, 206, but merely an exemplary structure for doing so.

The platform 230 includes tubular beams 234, 236 of square cross section, which beams 234, 236 are attached to both of the plates 120, 122. The beams 234, 236 are further attached to one or more plates 238, 240 at ends 242, 244 and 246, 248. The plates 238, 240 each have a surface 250, 252 to which the resilient members 200, 204 are mounted. It is believed that the mounting platform 230 (and platform 232) provide a more reliable transmission of the motion and forces from the generators 140, 142 to the drum 102.

Finally, the embodiment of FIGS. 1-3 has one or more resilient members 260 (which also may be referred to as isolation spring(s)). The resilient member 260 are attached at one end to the drum 102, with the second end attached to a frame that is attached to or mounted on the supporting structure (e.g., ground), or that is directly attached to mounted to the supporting structure (e.g., ground). The resilient member 260 acts to prevent the transmission of vibrations into the supporting structure.

Figure 4:
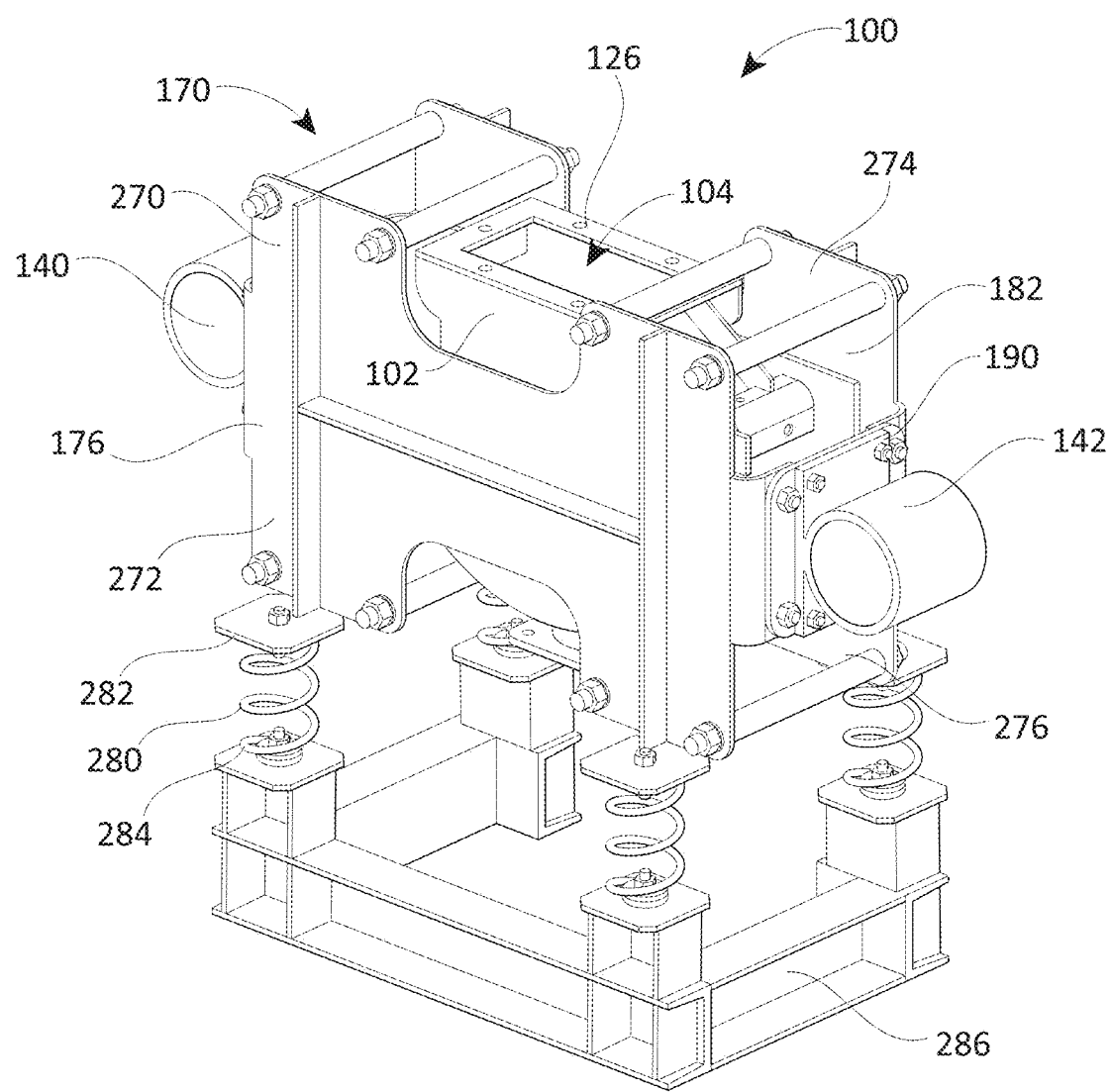
FIG. 4 is a perspective view of another embodiment of vibratory drum.

It will be recognized that many of details of the structures of the embodiment of FIG. 1-3 may vary, while the general structure remains quite the same. An embodiment of a drum 100 that includes a number of variations relative to the embodiment of FIGS. 1-3 is illustrated in FIG. 4. Similar structures are numbered in a similar fashion, while structures unique to the embodiment of FIG. 4 are given new reference numerals.

As illustrated in the vibratory apparatus 100 of FIG. 4, the drum 102 has a single opening 104 (with the cover plate detached and removed from the flange 126) through which material is introduced into and removed from the drum 102.

In addition, vibratory generators 140, 142 are disposed laterally relative to the central longitudinal axis and opposite each other across the drum 102. The generators 140, 142 may be of the type including a motor that defines the shaft to which the eccentric weights are attached. The apparatus 100 also includes a frame 170 with two transverse members 176, 182 and two cross members (one of which is shown at 190) to which the vibratory generators 140, 142 are attached (for example by fixedly securing a motor mount to the cross member, and then releasably attaching the generator 140 to the motor mount, by releasable fasteners such as nuts and bolts, for example).

As seen in FIG. 4, the transverse members 176, 182 need not have a particular elongated shape as in the embodiment of FIGS. 1-3. According to the embodiment of FIG. 4, the transverse members 176, 182 may be in the form of a plate having a general H-shape, with limbs 270, 272, 274, 276 that extend upward or downwardly from the center of the members 176, 178. As illustrated, in addition to the transverse members 176, 182 being attached by the cross members, the frame 170 may include cross bars that are attached between the upper limbs 270, 274 and between the lower limbs 272, 276 of the transverse members 176, 182.

Also unlike the embodiment of FIGS. 1-3, the drum 102 is not attached to the supporting structure or ground by one or more resilient members, or isolation springs. Instead, the frame 170 is supported a plurality of resilient members 280, and there is no connection between the drum 102 and the supporting structure. The resilient members 280, in the form of coil springs as illustrated, are disposed at each of the lower limbs 272, 276 of the transverse members 176, 182. Each of the resilient members 280 is attached at a first end 282 to one of the lower limbs 272, 276 and at a second end 284 to a frame 286 that may be disposed on the supporting structure, or that may itself be secured, for example through releasable fasteners such as nuts and bolts, to the supporting structure.

A further embodiment of a vibratory apparatus is illustrated in FIGS. 5-9, which vibratory apparatus has many structural similarities to the embodiments of FIGS. 1-3 and FIG. 4. For example, the vibratory apparatus illustrated in FIGS. 5-9 has a drum with a central longitudinal axis and vibratory generators disposed laterally relative to the central longitudinal axis and opposite each other across the drum. The generators each have a shaft to which the eccentric weights are attached. Further, apparatus also includes a frame with transverse members to which the vibratory generators are attached, and the frame is attached to the drum via resilient members. Because of the differences in design, and in particular the number of structures that are present in different numbers than in the embodiments of FIGS. 1-3 and FIG. 4, a different numbering system is used for the embodiment of FIGS. 5-9.

The vibratory apparatus 300 includes a drum 302 in which material is processed. The vibratory apparatus 300 may be referred to as a vibratory drum, and the two terms are used interchangeably herein. According to the embodiment of the vibratory drum 300 illustrated in FIGS. 5-9, material to be processed may be introduced into the drum 302 at a first end 304 and removed from the drum 302 through a second end 305. See, FIGS. 6 and 7. As such, the motion of the material in the drum 302 is not only circular about an inner surface of the drum 302, but the material also translates along the drum 302 from the first end 304 and the second end 305.

Figure 5:
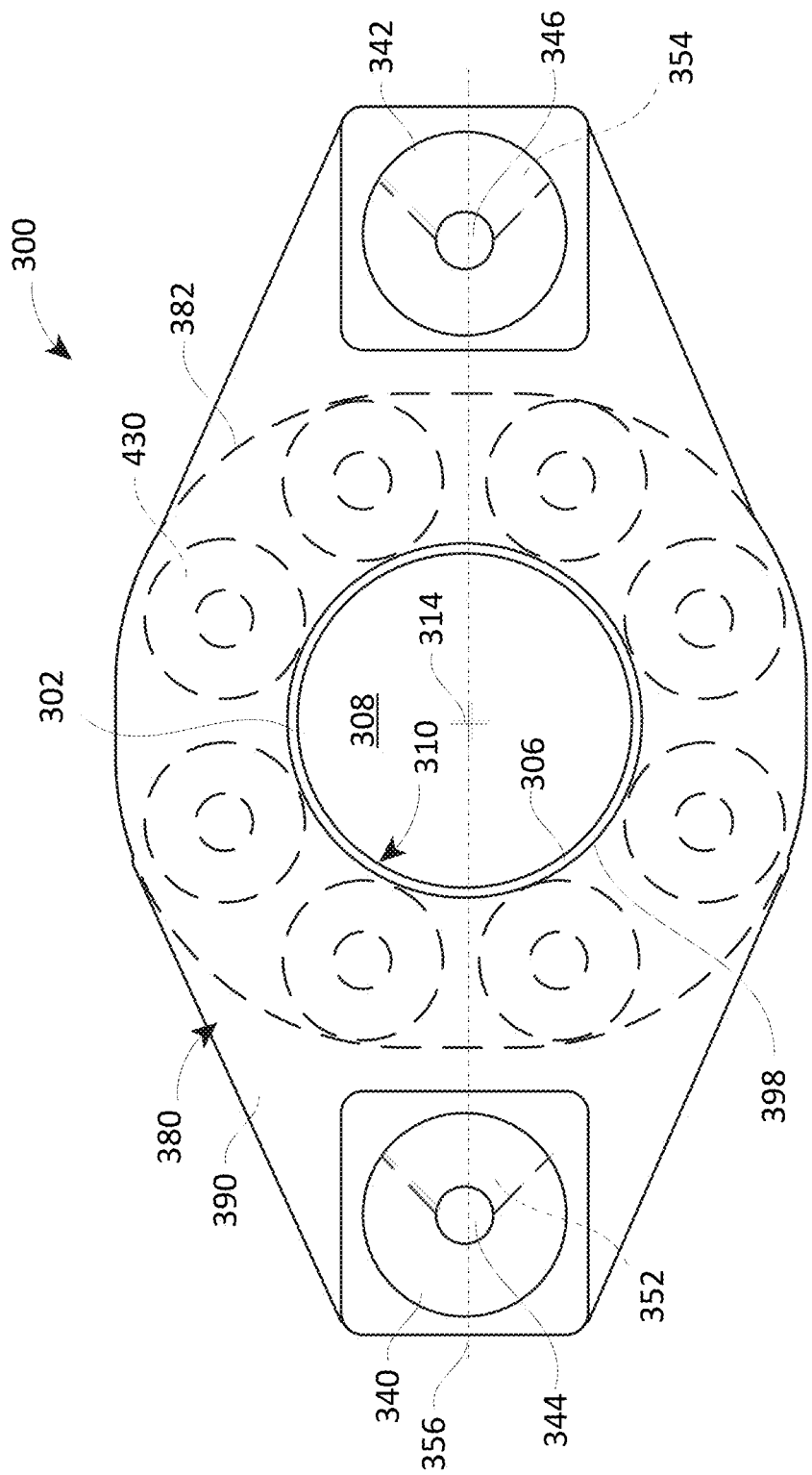
FIG. 5 is a frontal view of a further embodiment of a vibratory drum.
Figure 6:
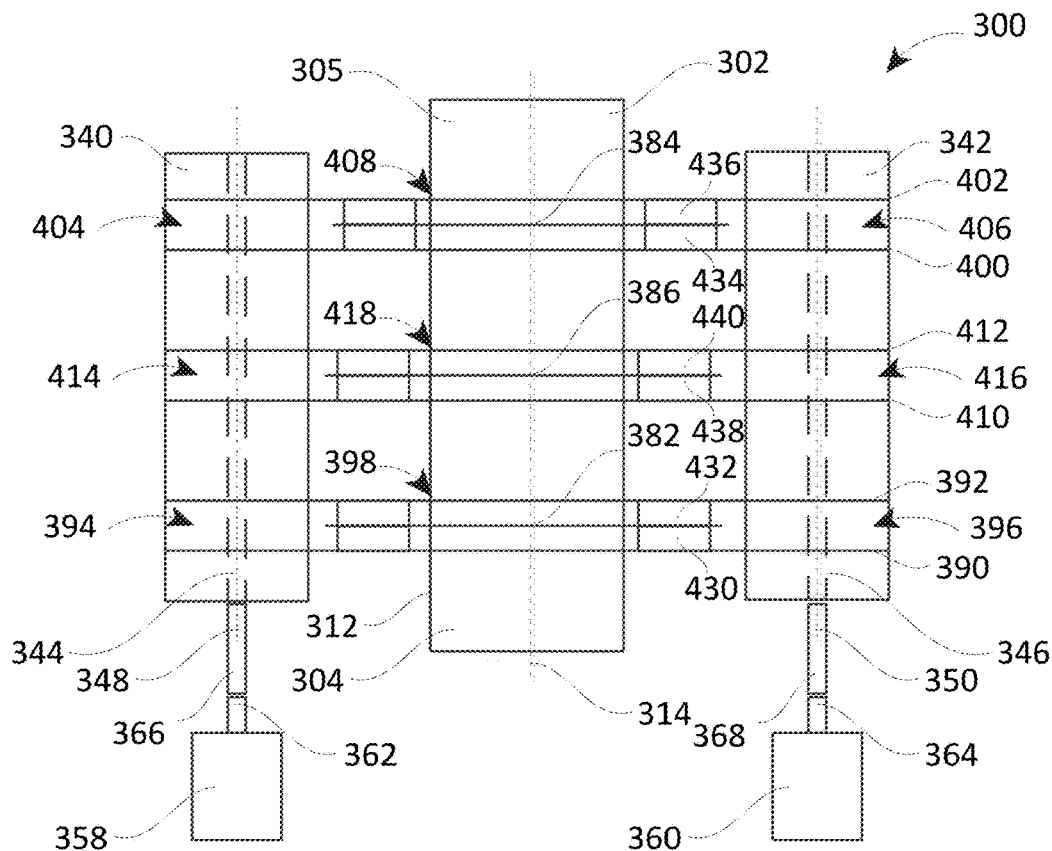
FIG. 6 is a plan view of the vibratory drum of FIG. 5.
Figure 7:
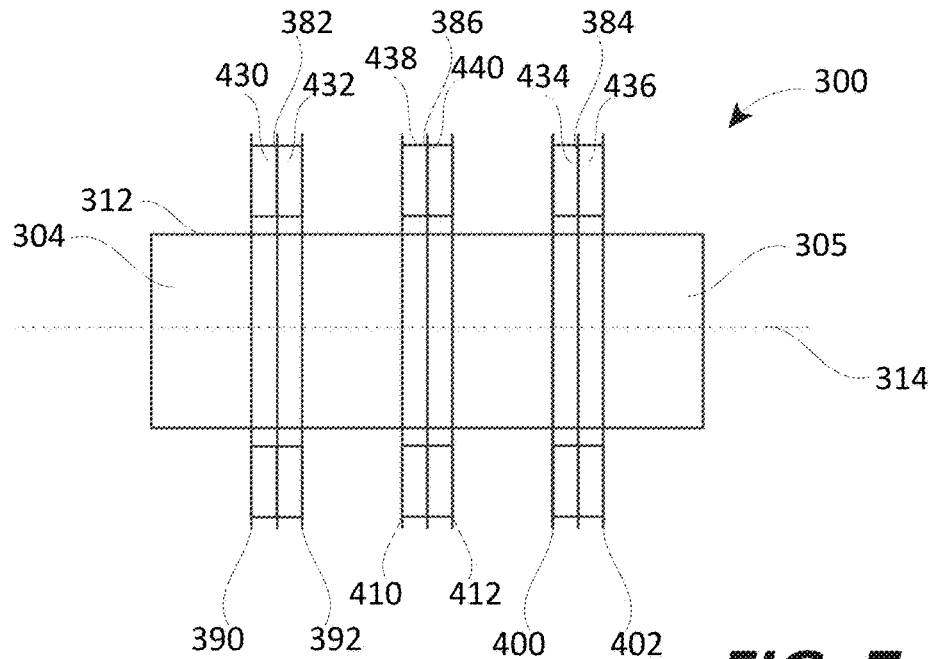
FIG. 7 is a side view of the vibratory drum of FIG. 5.
Figure 8:
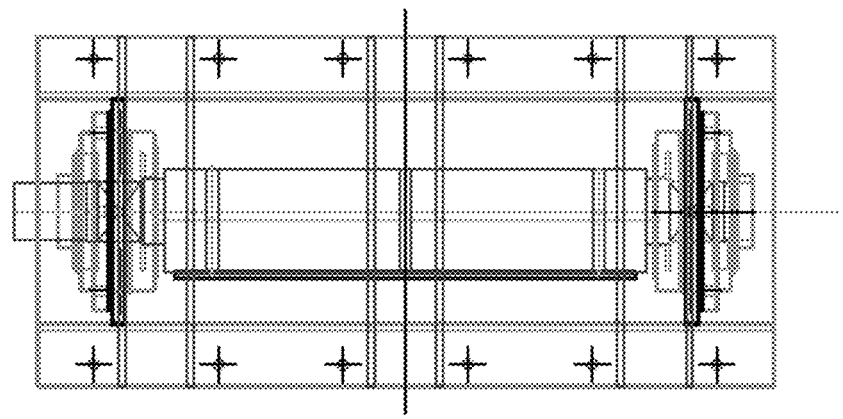
FIG. 8 is a side view of a drive box that may be used with the embodiment of FIG. 5.
Figure 9:
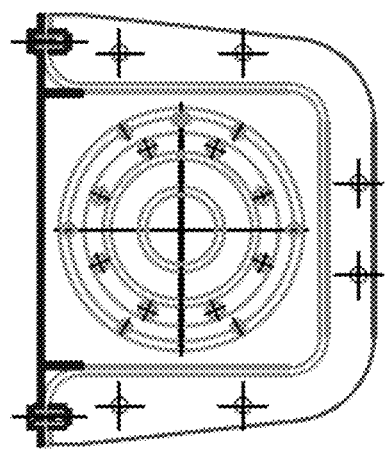
FIG. 9 is an end view of the drive box of FIG. 5.

The drum 302 has a generally cylindrical shape, with an annular wall 306 of circular cross-section that surrounds an interior volume 308, as best seen in FIG. 5. As illustrated, the wall 306 (and thus the drum 302) has a curved inner surface 310 that also is substantially circular in cross-section, and a curved outer surface 312 that also is substantially circular in cross-section. The drum 302 has a central longitudinal axis 314 that lies substantially along the center of the circular cross-section of the drum 302. The first and second ends 304, 306 may lie along the longitudinal axis 314.

According to other embodiments, the drum 302 may have a wall 306 that is not circular, but may be elliptical or hexagonal in cross-section, for example. As a further alternative, the wall 306 may have an inner surface that is curved (e.g., circular) in cross-section, but not an outer surface that is not curved in cross-section. In all such embodiments, the drum 302 may still have a central longitudinal axis 314 that is at the center of the cross-section of the drum 302.

According to the illustrated embodiment, the length of the drum 302 between the ends 304, 305 is considerably larger in dimension than the diameter of the drum 302 as defined by the wall 306. Compare, e.g., FIGS. 5 and 6. According to other embodiments, the dimension of the length between the ends 304, 305 may be comparable to the diameter of the drum 302. The length of the drum 302 may be selected, for example, to permit a certain dwell time for the materials in the drum 302 between their introduction at the first end 304 and their removal at the second end 305.

While not illustrated, a hopper or chute may be attached, either securely or releasably, to the first end 304 of the drum 302 to facilitate the introduction of material into the drum 302. Additionally, a perforated plate may be attached, securely or releasably, to the second end 305 of the drum 302 to facilitate the removal of material from the drum 302. The perforated plate may have a solid plate associated therewith that permits the number of perforations that are available for passage out of the drum 302 to be selected, so as to control the volume and/or rate of material removed from the drum 302 to be controlled.

The vibratory drum 302 also includes first and second vibratory generators 340, 342. The first and second vibratory generators 340, 342 are disposed laterally relative to the central longitudinal axis 314 and opposite each other across the tubular drum 302 (i.e., one of the generators 340 is disposed to the left of the drum 302 and the other of the generators 342 is disposed to right of the drum 102, with the directionality (right, left) for ease of explanation and by way of limitation). Each of the first and second vibratory generators 340, 342 includes a shaft 344, 346 having a shaft longitudinal axis 348, 350 parallel the central longitudinal axis 314. See FIG. 6. Each vibratory generator 340, 342 also has one or more eccentric weights 352, 354 (see FIG. 5) attached to the shaft 344, 346 for rotation about the shaft longitudinal axis 348, 350.

As illustrated, the shaft axes 348, 350 are not only parallel to the central longitudinal axis 314, but the axes 348 and 350 are disposed along a single line 356 that traverses the central axis 314. As illustrated, the line 356 also passes through the center of mass of the assembly; if the center of mass was not aligned with the central axis, the line 356 may pass through the center of mass but not the central axis 314. Further, the axes 348, 350 are each disposed at the same distance from the central axis 314 along that line 356. It is believed that this arrangement may cause the most circular motion in the material in the drum 102, but does not mean that all embodiments of the drum 100 necessarily must have this orientation.

In accordance with the embodiment of FIGS. 5-9, each of the first and second generators 340, 342 includes a motor 358, 360 is separate from the shafts 344, 346 that mount the weights (or masses) 352, 354. See FIG. 6. The motors 358, 360 may be mounted on the supporting structure or ground separate from the remainder of the drum 300. Each of the motors 358, 360 has a shaft 362, 364 that is connected one of the shafts 344, 346, for example through the use of an intermediate cardan shaft 366, 368 (i.e., a shaft that has a universal joint at one or both ends enabling it to rotate freely when in varying angular relation to the shafts to which it is joined). Other suitable mechanisms may be used to connect the shafts 344, 346 to the motor shafts 362, 364 as well. The weights 352 appear to be at the same angular position on the shaft 344 as the weights 354 mounted on the shaft 346 in FIG. 5; it is believed that this state will occur naturally over time as the two motors 358, 360 synchronize with each other.

The drum 300 also includes a frame 380 that cooperates with features of the drum 302, and that is resiliently coupled to the drum 302 through a plurality of resilient members.

To facilitate the coupling of the frame 380 to the drum 302, the drum 302 has at least a first flange 382 disposed at the first end 304 of the drum 302 and a second flange 384 disposed at the second end 305 of the drum 302. As illustrated, the drum 302 includes a third, intermediate flange 386 that is disposed between the first and second ends 304, 305 of the drum. According to other embodiments, more than one intermediate flange may be provided, or no intermediate flange may be provided; the presence or absence of the intermediate flanges may be related to the overall length of the drum 302, as will be recognized in accord with the disclosure below. The flanges 382, 384, 386 may be annular in shape, considering the circular cross-section of the drum 302. While the flanges 382, 384, 386 are illustrated of the same general size and shape, this need not be the case for all embodiments. The flanges 382, 384, 386 are securely attached (e.g., by welding) to the outer surface 312 of the drum wall 306.

To cooperate with the flanges 382, 384, 386, the frame 380 includes a plurality of transverse plates. A first pair of transverse plates 390, 392 is disposed at the first end 304 of the drum 302 with first and second ends 394, 396 disposed laterally of the central longitudinal axis 314 and central passages 398 to receive the drum 302. A second pair of transverse plates 400, 402 is disposed at the second end 305 of the drum 302 with first and second ends 404, 406 disposed laterally of the central longitudinal axis 314 and central passages 408 to receive the second end 305 of the drum 302. An intermediate pair of transverse plates 410, 412 is disposed between the first and second ends 304, 305 of the drum 302 with first and second ends 414, 416 disposed laterally of the central longitudinal axis 314 and central passages 418 to receive the drum 302 between the first and second ends 304, 305.

As illustrated, a plurality of resilient members is disposed between each of the flanges 382, 384, 386 and the pairs of plates 390, 392, 400, 402, 410, 412. A first and second plurality of resilient members 430, 432 are disposed between the flange 382 and the plates 390, 392, with the first plurality 430 disposed between the plate 390 and the flange 382 and the second plurality 432 disposed between the plate 392 and the flange 382. A third and fourth plurality of resilient members 434, 436 are disposed between the flange 384 and the plates 400, 402, with the third plurality 434 disposed between the plate 400 and the flange 384 and the fourth plurality 436 disposed between the plate 402 and the flange 384. A fifth and sixth plurality of resilient members 438, 440 are disposed between the flange 386 and the plates 410, 412, with the fifth plurality 438 disposed between the plate 410 and the flange 386 and the sixth plurality 440 disposed between the plate 412 and the flange 386. Additional resilient members may be included if additional flanges and pairs of plates are provided.

As is also illustrated, each of the resilient members of the sets 430, 432, 434, 436, 438, 440 are toroidal in shape. The resilient members also each have a longitudinal axis, which axis is parallel to the central longitudinal axis 314. As seen in FIG. 5 relative to set 430, each of the sets 430, 432, 434, 436, 438, 440 may include an even number (e.g., eight) resilient members arranged about an outer circumference of the drum 302. In particular, the illustrated resilient members are arranged in pairs of two to the left, right, above, and below the drum 302; according other embodiments, the resilient members may be disposed equally about the outer circumferences of the drum 302. It will be recognized that the number of resilient members included in the sets 430, 432, 434, 436, 438, 440 may vary between embodiments.

Similar to the other embodiments, the first vibratory generator 340 is attached to the first ends 394, 404 of the first pair of plates 390, 392 and the second pair plates 400, 402, and the second vibratory generator 342 is attached to the second ends 396, 406 of the first pair of plates 390, 392 and the second pair plates 400, 402. As illustrated, the first vibratory generator 430 may also be attached to the first ends 414 of the intermediate pair of plates 410, 412, and the second vibratory generator 432 may be attached to the second ends 416 of the intermediate pair of plates 410, 412.

According to an embodiment of the drum 300, each of the first vibratory generator 340 and the second vibratory generator 342 include a housing, the shaft 344, 346 and weights 352, 354 being mounted in the housing. See FIGS. 8 and 9. The housing may be attached to the plates 390, 392, 400, 402, 410, 412, thereby connecting the plates 390, 392, 400, 402, 410, 412 as well as attaching the vibratory generators 340, 342 to the frame 380. In fact, the plates 390, 392, 400, 402, 410, 412 may be divided into two parts (roughly along the line 356 illustrated in FIG. 5) with the two parts joined to the housings to connect the parts of the plates 390, 392, 400, 402, 410, 412 together.

In addition, the vibratory drum 300 may be supported on resilient members (or isolation springs) on the supporting structure (e.g., ground) or a frame disposed on the supporting structure. In accord with the embodiments described above, the isolation springs may be disposed between the drum 302 or the frame 380 and the supporting structure or frame.

Although the preceding text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed is:

1. A vibratory drum comprising:
a tubular drum having a drum longitudinal axis;
first and second vibratory generators disposed laterally relative to the longitudinal axis and opposite each other across the tubular drum,
a frame to which the first and second vibratory generators are attached; and
a plurality of resilient elements attached at a first end to the tubular drum and at a second end to the frame, each of the plurality of resilient elements having a hollow center,
whereby the vibratory motion of the generators is transferred to the tubular drum to impart a circular motion to material disposed in the tubular drum.

2. The vibratory drum according to claim 1, wherein:
each of the first and second vibratory generators comprises a shaft having a shaft longitudinal axis parallel the drum longitudinal axis and one or more eccentric weights attached to the shaft for rotation about the shaft longitudinal axis.

3. The vibratory drum according to claim 2, wherein the shaft longitudinal axes and the drum longitudinal axis are disposed along a single line that traverses the drum longitudinal axis and passes through the center of mass of the vibratory drum.

4. The vibratory drum according to claim 3, wherein the shaft longitudinal axes are each disposed at a same distance from the drum longitudinal axis along the single line.

5. The vibratory drum according to claim 2, wherein each of the first and second generators comprises a motor, the motor comprising the shaft.

6. The vibratory drum according to claim 2, wherein each of the first and second generators comprises a motor, the motor coupled to the shaft.

7. The vibratory drum according to claim 1, wherein the tubular drum has a cylindrical shape, with a wall having a curved inner surface that is circular in cross-section.

8. A vibratory drum comprising:
a tubular drum having a drum longitudinal axis and first and second ends disposed along the drum longitudinal axis;
first and second vibratory generators disposed laterally relative to the drum longitudinal axis and opposite each other across the tubular drum,
each of the first and second vibratory generators comprising a shaft having a shaft longitudinal axis parallel the drum longitudinal axis and one or more eccentric weights attached to the shaft for rotation about the shaft longitudinal axis;
a frame comprising a first transverse member disposed at the first end of the tubular drum with first and second ends disposed laterally of the drum longitudinal axis and a second transverse member disposed at the second end of the tubular drum with first and second ends disposed laterally of the drum longitudinal axis,
the first vibratory generator attached to the first ends of the first and second transverse members and the second vibratory generator attached to the second ends of the first and second transverse members,
at least a first and a second resilient member, the first resilient member attached at a first end to the tubular drum and at a second end to the first end of one of the first and second transverse members and the second resilient member attached at a first end to the tubular drum and at a second end to the second end of one of the first and second transverse members,
wherein the first and second resilient members are toroidal in shape relative to a longitudinal axis, which axis is parallel to the drum longitudinal axis,
whereby the vibratory motion of the generators is transferred to the tubular drum to impart a circular motion to material disposed in the tubular drum.

9. The vibratory drum according to claim 8, wherein the shaft longitudinal axes and the drum longitudinal axis are disposed along a single line that traverses the drum longitudinal axis and passes through the center of mass of the vibratory drum.

10. The vibratory drum according to claim 9, wherein the shaft longitudinal axes are each disposed at a same distance from the drum longitudinal axis along the single line.

11. The vibratory drum according to claim 8, wherein each of the first and second generators comprises a motor, the motor comprising the shaft.

12. The vibratory drum according to claim 8, wherein each of the first and second generators comprises a motor, the motor coupled to the shaft.

13. The vibratory drum according to claim 8, wherein the first and second resilient members are disposed laterally relative to the longitudinal axis, each between one of the first and second vibratory generators and the tubular drum.

14. The vibratory drum according to claim 8, wherein the tubular drum has a cylindrical shape, with a wall having a curved inner surface that is circular in cross-section.

15. A vibratory drum comprising:
a tubular drum having a drum longitudinal axis and first and second ends disposed along the drum longitudinal axis,
the tubular drum having at least a first flange disposed at the first end of the tubular drum and a second flange disposed at the second end of the tubular drum;
first and second vibratory generators disposed laterally relative to the drum longitudinal axis and opposite each other across the tubular drum,
each of the first and second vibratory generators comprising a shaft having a shaft longitudinal axis parallel the drum longitudinal axis and one or more eccentric weights attached to the shaft for rotation about the shaft longitudinal axis;
a frame comprising a plurality of transverse plates, a first pair of transverse plates disposed at the first end of the tubular drum with first and second ends disposed laterally of the drum longitudinal axis and a central passage to receive the tubular drum, and a second pair of transverse plates disposed at the second end of the tubular drum with first and second ends disposed laterally of the drum longitudinal axis and a central passage to receive the second end of the tubular drum,
the first vibratory generator attached to the first ends of the first pair and the second pair transverse plates and the second vibratory generator attached to the second ends of the first pair and the second pair transverse plates, a first and second plurality of resilient members, the first plurality disposed between a first of the first pair of transverse plates and the first flange and the second plurality disposed between a second of the first pair of transverse plates and the first flange, and a third and fourth plurality of resilient members, the third plurality disposed between a first of the second pair of transverse plates and the second flange and the fourth plurality disposed between a second of the second pair of transverse plates and the second flange, wherein each of the resilient members is toroidal in shape relative to a longitudinal axis, which axis is parallel to the drum longitudinal axis, whereby the vibratory motion of the generators is transferred to the tubular drum to impart a circular motion to material disposed in the tubular drum.

16. The vibratory drum according to claim 15, wherein the shaft longitudinal axes and the drum longitudinal axis are disposed along a single line that traverses the drum longitudinal axis and passes through the center of mass of the vibratory drum.

17. The vibratory drum according to claim 16, wherein the shaft longitudinal axes are each disposed at a same distance from the drum longitudinal axis along the single line.

18. The vibratory drum according to claim 15, wherein each of the first and second generators comprises a motor, the motor comprising the shaft.

19. The vibratory drum according to claim 15, wherein each of the first and second generators comprises a motor, the motor coupled to the shaft.

20. The vibratory drum according to claim 15, wherein the first and second pluralities of resilient members and the third and fourth pluralities of resilient members are disposed laterally relative to the longitudinal axis, about an outer circumference of the tubular drum.

* * * * *